G. S. BILLMAN.
MACHINE FOR CLEANING INTESTINES.
APPLICATION FILED JUNE 15, 1911.
1,023,547.
Patented Apr. 16, 1912.
2 SHEETS—SHEET 1.
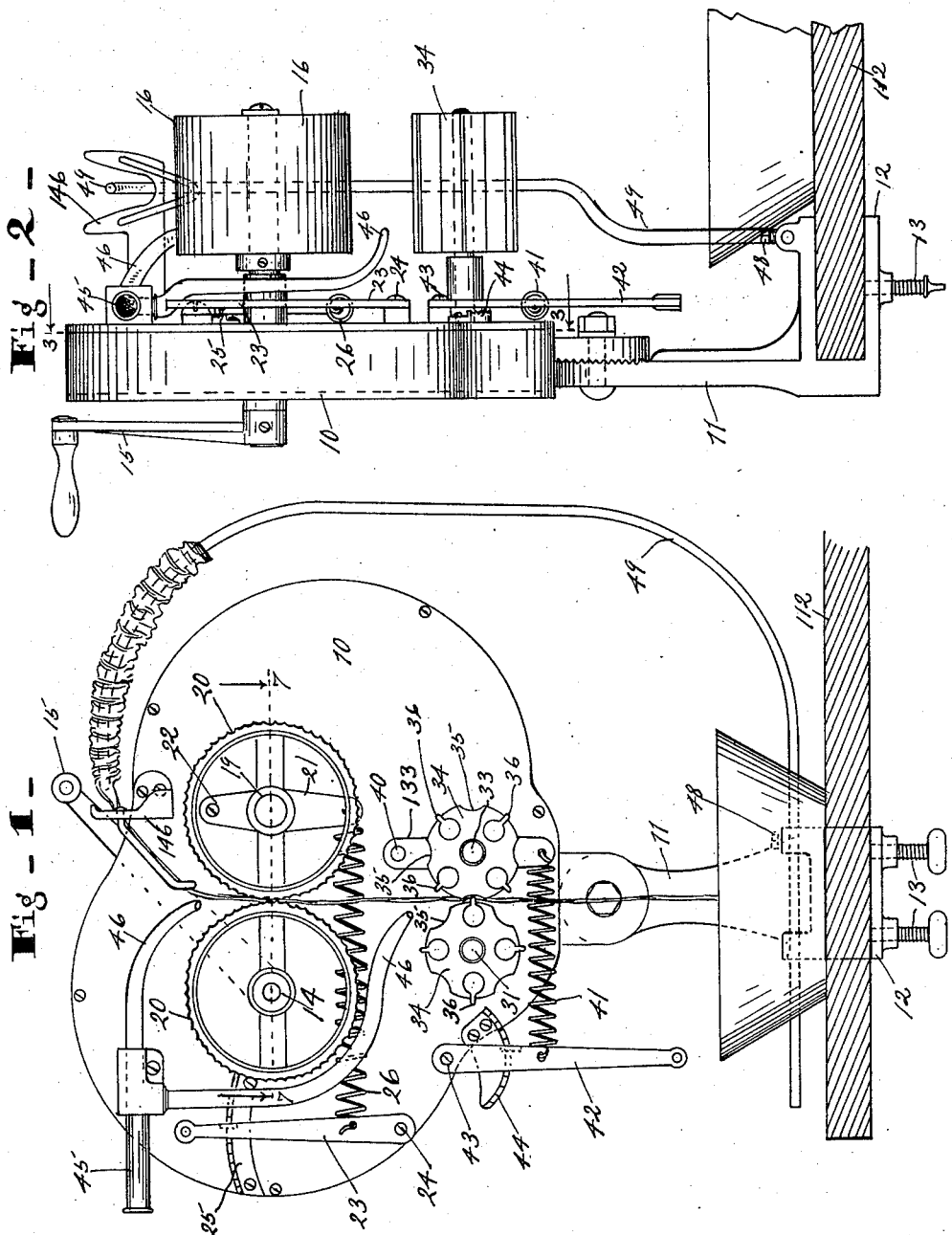
WITNESSES:
INVENTOR.
Gustus S. Billman.
BY
ATTORNEY.

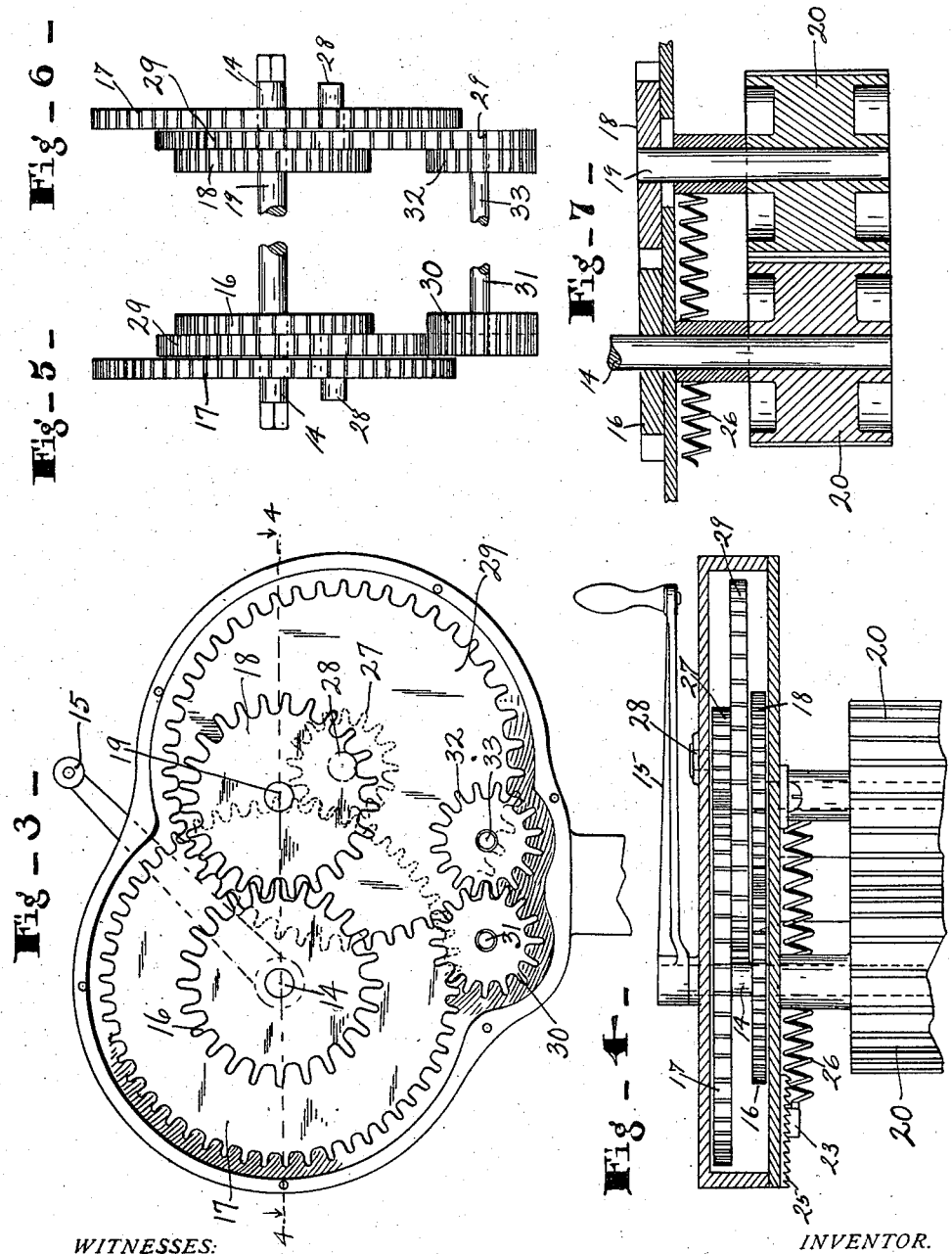

UNITED STATES PATENT OFFICE.

GUSTUS S. BILLMAN, OF SHELBYVILLE, INDIANA.

MACHINE FOR CLEANING INTESTINES.

1,023,547. Specification of Letters Patent. Patented Apr. 16, 1912.

Application filed June 15, 1911. Serial No. 633,228.

*To all whom it may concern:*

Be it known that I, GUSTUS S. BILLMAN, a citizen of the United States, and a resident of Shelbyville, county of Shelby, and State of Indiana, have invented a certain useful Machine for Cleaning Intestines; and I do hereby declare that the following is a full, clear, and exact description thereof, reference being had to the accompanying drawings.

The object of this invention is to provide a machine for cleaning animal intestines for sausage and other uses when they are in a fresh or green condition.

The features of the machine are the provision of a pair of rotating tension drums for flattening the intestine and a pair of rotary knives positioned below them which serve to scrape the flattened intestine on both sides, tension being given to the intestine by maintaining the tension drum at a lower speed of revolution than the scraping blades.

The chief feature of the invention lies in passing the intestines through the machine in the same direction in which they are scraped contrary to the usual practice of scraping them in a direction opposite to their line of movement.

The nature of the invention will be understood from the accompanying drawings and the following description and claims.

In the drawings Figure 1 is an elevation of one side of the machine. Fig. 2 is a left-hand elevation of the machine as shown in Fig. 1. Fig. 3 is a section on the line 3—3 of Fig. 2, through a part of the device. Fig. 4 is a horizontal section of a part of the machine on the line 4—4 of Fig. 3, with the crank, however, in a different position. Fig. 5 is a left-hand elevation of the gear-train shown in Fig. 3. Fig. 6 is a right-hand elevation of the same. Fig. 7 is a horizontal transverse section on the line 7—7 of Fig. 1.

There is shown in detail a gear casing 10 adjustably mounted on a support 11 having clamping fingers 12 adapted to be secured to a bench or table 112 by means of screws 13. A main or driving shaft 14 rotated by means of a crank 15 or any other suitable means has gears 16 and 17 rigidly secured thereon, the gear 16 being substantially one half the diameter of the gear 17. Said gear 16 meshes with a gear 18 of like dimensions secured on a shaft 19 at substantially the same height in the casing as the shaft 14. Said shafts 14 and 19 project through the cover of the casing 10 and on their outer ends have tension drums 20 secured thereon. Said tension drums have corrugated peripheries engaging each other, see Fig. 1. The shaft 14 has its bearing in the main casing 10, whereas the shaft 19 is pivotally mounted on a lever 21 fulcrumed at one end 22 to one side of the casing 10 with the lower end spring-connected to a tension lever 23 fulcrumed in the casing at 24, see Fig. 1, and with a rack bar 25 also secured to said casing, whereby the lever 23 may be locked in any desired position and thus through the spring 26 the gear may be held in any desired tension against the drum 16.

The gear 17 splined on the shaft 14 meshes with a pinion 27 splined on a shaft 28 having bearing in the casing 10. Said shaft 28 has a second gear 29 also splined thereon which meshes with a gear 30 on a shaft 31 having bearing in the casing 10. The gear 29 and the gear 17 are of substantially the same dimensions. Meshing with the gear 30 is a gear 32 on a shaft 33, said gears being of like dimensions, but the face of the gear 30 is substantially twice that of the gear 32, see Figs. 5 and 6. The shafts 31 and 33 project through the casing 10 and on their outer ends have rotary scrapers 34 secured thereon, see Fig. 1.

The rotary scrapers 34 are cylindrical in shape and are rigidly secured to their shafts 31 and 33, respectively, and have longitudinally arced grooves 35 on the peripheral surfaces thereof with a slot intermediate each pair of grooves in which may be inserted a scraping blade 36. Said scrapers are so positioned on their respective shafts that as they rotate, a scraper blade in one holder will, so to speak, mesh in the concavity of the mating blade holder. Thus the blade will push the holders from the left to the right and from the right to the left alternately.

The rotary scrapers 34 are provided with a means for maintaining tension between them similar to that used to maintain the tension between the drums 16 and 18. Thus the shaft 33 is mounted on the rocking bar 133 pivoted to the casing at 40 and with a spring 41 connecting the free end of said lever to a second lever 42 pivoted at 43, and is provided with a rack bar 44 also secured to the casing and with engaging means on said lever, whereby said lever may be held in any desired position and the scrapers held together with any desired degree of pressure.

Through the pipe 45 and nozzles 46 leading therefrom water from any source of supply may be introduced against the tension drums and the rotary cleaners for flushing purposes. Secured to the upper side of the casing there is a guide trough 146 by which the intestine may be directed to the desired roll.

An inverting rod 49 is secured to the foot of the machine by means of a set screw 48 and is bent in a curved and upward direction over the machine to a point substantially midway of them achine near the guiding mechanism. This rod 49 is not necessary unless it is desired that the intestine be supplied to the machine inverted.

To operate the invention for scraping beef intestines, at least two treatments of the intestine are necessary, one for removing the fat and the second for removing the slime. For the first operation the end of the intestine is carried through the guide 146 and introduced between the tension rolls 20 and the crank 15 turned to operate said tension rolls. As the intestine is entered between said rolls 20 the spring 26 will give slightly and allow said intestine to be passed through, but will press the intestine flat. Further movement of the crank 15 will cause the intestine to pass between the rotary scrapers 34 with a similar yielding movement of them allowed by the spring 41. The gearing from the shaft 14 driving the tension rolls 20 and the gearing from the shaft 14 to the shaft 31 which drives the rotary scrapers 34 are such that the scrapers revolve at greater speed than the tension drums. Therefore, the rotary scrapers draw the intestine through the machine. Both sides of the intestine between the scrapers are given a number of short sharp scraping strokes by the scraping blades. An additional revolution of the crank will cause the further passing of the intestine between the tension rolls and will also cause the laceration of the slime on the inside of said intestine.

In the second operation, that of removing the slime from the interior of the intestine, it is necessary that the intestine be turned inside out. This is done by drawing one end over the free upper end of the inverting rod 49 after the now common practice. Thereafter the intestine is pulled off of said inverting rod and passed through the machine the same as above described. Thus both sides of the intestine may be cleaned.

I claim as my invention:

1. In a machine for cleaning intestines a pair of rotary scrapers cylindrical in shape and with their peripheries provided with alternating grooves and projections, and means for mounting the two scrapers so that the projections of one scraper will enter the grooves of the other scraper as the same are rotated.

2. In a machine for cleaning intestines, a pair of rotary scrapers mounted so as to coöperate in their action on the intestine said scrapers being cylindrical in shape and having longitudinally arced grooves on their surfaces with a radially projecting longitudinally extending blade between each pair of grooves, and means for mounting said scrapers so that the blade of one scraper will project into the groove of the other scraper.

3. A machine for cleaning intestines including a pair of engaging feed rolls between which an intestine is adapted to be fed, rocking bars in which the ends of one of said feed rolls is mounted so that said feed roll may be moved toward and away from the other feed roll, a spring connected with one end of said rocking bars, a lever attached to the other end of said spring for controlling the tension of the spring and tending to force one feed roll against the other, means for holding said tension lever in a desired position, rotary cleaners mounted below said feed rolls and revoluble in the same direction, rocking arms in which one of said cleaners is mounted so as to be movable toward and away from the other cleaner, a spring extending from said rocking arms, a lever connected with the other end of said spring for adjusting the tension thereof and controlling the pressure between said cleaners, means for holding said last-mentioned lever in position, and means for driving the cleaners at a greater peripheral speed than the feed rolls.

In witness whereof, I have hereunto affixed my signature in the presence of the witnesses herein named.

GUSTUS S. BILLMAN.

Witnesses:
 G. H. BOINK,
 O. M. McLAUGHLIN.

---

Copies of this patent may be obtained for five cents each, by addressing the "Commissioner of Patents, Washington, D. C."